United States Patent [19]

Yarnall

[11] 3,806,157
[45] Apr. 23, 1974

[54] ACCESSORY FOR BICYCLE PORTAGE
[75] Inventor: Paul J. Yarnall, Rochester, N.Y.
[73] Assignee: The Raymond Lee Corporation, New York, N.Y. ; a part interest
[22] Filed: Jan. 5, 1973
[21] Appl. No.: 321,315

[52] U.S. Cl................................. 280/289, 224/25 R
[51] Int. Cl................................................ B62h 1/00
[58] Field of Search ............ 224/5 P, 5 R, 30 R, 31, 224/42, 5 H, 5 V, 25 R; 280/289

[56] References Cited
UNITED STATES PATENTS
2,506,685  5/1950  Sadloski et al. .................. 224/5 P X FOREIGN PATENTS OR APPLICATIONS
361,436   6/1905  France ............................ 280/289
381,744   1/1908  France ............................ 280/289
449,572   9/1927  Germany .......................... 280/289
800,277   10/1950 Germany .......................... 280/289

Primary Examiner—Gerald M. Forlenza
Assistant Examiner—Jerold M. Forsberg

[57] ABSTRACT

A bicycle shoulder hook extends between the bicycle top frame tube and down tubes along the inside thereof and coplanar therewith. A clasp adjacent one end of the hook engages the top tube adjacent the rear end. A clasp on the other end of the hook engages the down tube adjacent the said one end.

2 Claims, 4 Drawing Figures

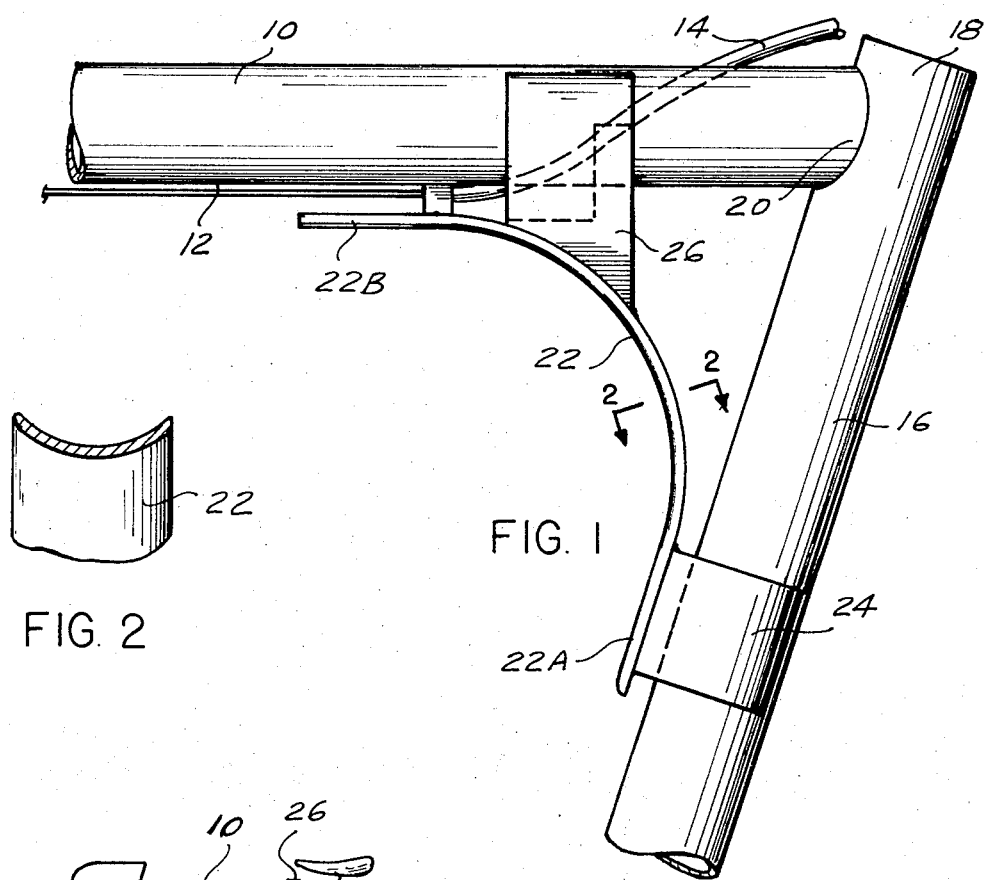
FIG. 1
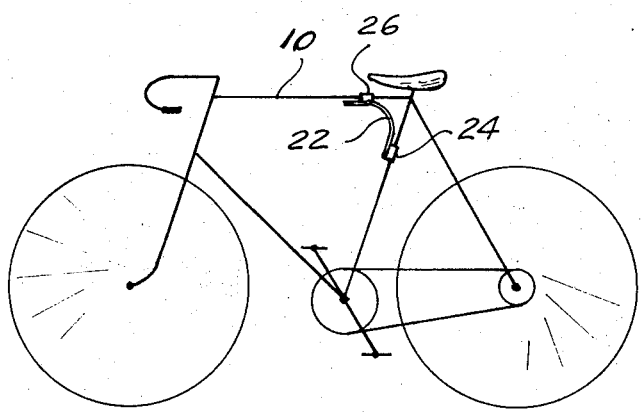
FIG. 2
FIG. 3
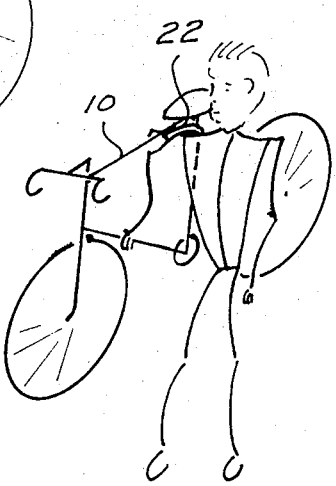
FIG. 4

ACCESSORY FOR BICYCLE PORTAGE

FIELD OF THE INVENTION

My invention is directed toward an accessory which can be used by an individual to facilitate portage of a bicycle when the individual must carry the bicycle some distance.

SUMMARY

To this end, I provide a shoulder engaging device also securable to the bicycle whereby the individual can carry the bicycle on his shoulder in a comfortable manner.

More particularly, the bicycle has a top horizontal frame tube. One end of a down frame tube is secured to the rear of the top tube and the down tube extends downward and inward therefrom. A shoulder hook coplanar with the tubes is disposed along the inside of both tubes in the region where the one end of the down tube and the rear end of the top tube meet. Clasp means adjacent one end of the hook engages the top tube. Clasp means on the other end of the hook engages the down tube.

In use, the individual inserts his arm through the frame and the hook rests upon his shoulder. The bicycle can then be carried readily.

BRIEF DESCRIPTION OF THE DRAWINGS

In the drawings:

FIG. 1 is a detail side elevation of my invention;

FIG. 2 is a section taken along line 2—2 in FIG. 1;

FIG. 3 is a side diagram of a bicycle with my invention in position; and

FIG. 4 is a perspective diagram of my invention in use.

DETAILED DESCRIPTION OF PREFERRED EMBODIMENTS

Referring now to FIGS. 1–4, a bicycle has a top horizontal frame tube 10 supporting brake cable 12 and brake cable cover 14. A down frame tube 16 has an upper end 18 secured to the rear end 20 of the tube 10 and extends downwardly and forwardly.

A shoulder hook 22 has one end portion 22A parallel to tube 16 and an opposite end portion 22B parallel to tube 10. Hook 22 is essentially coplanar with the tubes and is disposed along the inside in the region of the interconnected ends.

First U shaped clasp means 24 secured to portion 22A detachable engages tube 16 adjacent end 18. Second like clasp means 26 secured to the main body portion of the hook adjacent portion 22B detachably engages tube 10 adjacent end 20.

The invention can then be used as shown and as previously described.

While I have described my invention with particular reference to the drawings, such is not to be considered as limiting its actual scope.

Having thus described this invention, what is claimed and asserted as new is:

1. In combination with a bicycle having a top horizontal frame tube connected at its rear end to the upper end of a downwardly and inwardly inclined down tube;

a shoulder hook having two ends essentially coplanar with the tubes and disposed along the inside adjacent the interconnected ends of the tubes;

first clasp means disposed adjacent one end of the hook to connect same to the top tube adjacent the rear end;

second clasp means disposed at the other end of the hook to interconnect same to the down tube adjacent the top end;

wherein each clasp means is U-shaped; and wherein one end portion of the hook is parallel to the top tube and the other end portion is parallel to the down tube.

2. The combination of claim 1 wherein the first means is disposed on the main body of the hook adjacent said one end portion.

* * * * *